US011008523B2

(12) United States Patent
Pulikkathara et al.

(10) Patent No.: US 11,008,523 B2
(45) Date of Patent: May 18, 2021

(54) CHEMICAL INHIBITORS WITH SUB-MICRON MATERIALS AS ADDITIVES FOR ENHANCED FLOW ASSURANCE

(71) Applicant: M-I L.L.C., Houston, TX (US)

(72) Inventors: Merlyn Xavier Pulikkathara, Cypress, TX (US); Chandrashekhar Yeshwant Khandekar, Houston, TX (US)

(73) Assignee: CAMERON INTERNATIONAL CORPORATION, Houston, TX (US)

(*) Notice: Subject to any disclaimer, the term of this patent is extended or adjusted under 35 U.S.C. 154(b) by 687 days.

(21) Appl. No.: 14/885,445

(22) Filed: Oct. 16, 2015

(65) Prior Publication Data

US 2016/0108327 A1 Apr. 21, 2016

Related U.S. Application Data

(60) Provisional application No. 62/065,321, filed on Oct. 17, 2014.

(51) Int. Cl.
*C10G 75/02* (2006.01)
*C09K 8/524* (2006.01)
(Continued)

(52) U.S. Cl.
CPC ............ *C10G 75/02* (2013.01); *B01D 21/01* (2013.01); *C09K 8/03* (2013.01); *C09K 8/032* (2013.01);
(Continued)

(58) Field of Classification Search
CPC ........ C10G 75/02; C10G 75/04; C10G 3/107; B01D 21/01; C09K 8/03; C09K 8/032; C09K 8/035; C09K 2208/08; E21B 37/06
See application file for complete search history.

(56) References Cited

U.S. PATENT DOCUMENTS 4,713,195 A * 12/1987 Schneider ................ C02F 5/14 252/180
6,140,276 A * 10/2000 Duncum ........... C08G 73/0206 507/90

(Continued)

FOREIGN PATENT DOCUMENTS

EP 1403463 A1 3/2004
EP 2137279 A1 10/2008

(Continued)

OTHER PUBLICATIONS

International Preliminary Report on Patentability issued in International Application No. PCT/US2015/056231 dated Apr. 27, 2017 (10 pages).

(Continued)

*Primary Examiner* — Crystal J Miller

(57) ABSTRACT

Methods may include admixing an additive composition with a hydrocarbon fluid, wherein the additive composition contains at least one inhibitor and at least one sub-micron particle. Additional methods may include providing an additive composition containing at least one inhibitor and at least one sub-micron particle; adding the additive composition to a fluid capable of precipitating at least one of at least of asphaltenes, wax, scale, and gas hydrates; and transporting the fluid containing the additive composition.

13 Claims, 5 Drawing Sheets

Viscosity [cP]
30
25
20
15
10
5
0
0 10 20 30 40 50 60
Temperature [°C]
Baseline
Nanotubes
Modified nanotubes
WI + nanotubes

(51) Int. Cl.

| | |
|---|---|
| ***C09K 8/528*** | (2006.01) |
| ***C09K 8/03*** | (2006.01) |
| ***C10G 75/04*** | (2006.01) |
| ***C10L 3/10*** | (2006.01) |
| ***C10L 1/18*** | (2006.01) |
| ***C10L 1/12*** | (2006.01) |
| ***C10L 10/04*** | (2006.01) |
| ***B01D 21/01*** | (2006.01) |
| ***C09K 8/035*** | (2006.01) |
| ***C09K 15/02*** | (2006.01) |
| ***C09K 15/06*** | (2006.01) |
| ***C09K 15/18*** | (2006.01) |
| ***E21B 37/06*** | (2006.01) |

(52) U.S. Cl.

CPC .............. *C09K 8/035* (2013.01); *C09K 8/524* (2013.01); *C09K 8/528* (2013.01); *C09K 15/02* (2013.01); *C09K 15/06* (2013.01); *C09K 15/18* (2013.01); *C10G 75/04* (2013.01); *C10L 1/1208* (2013.01); *C10L 1/1225* (2013.01); *C10L 1/1233* (2013.01); *C10L 1/1283* (2013.01); *C10L 1/1291* (2013.01); *C10L 1/1802* (2013.01); *C10L 3/107* (2013.01); *C10L 10/04* (2013.01); *E21B 37/06* (2013.01); *C09K 2208/08* (2013.01); *C09K 2208/10* (2013.01); *C09K 2208/22* (2013.01); *C10L 2250/06* (2013.01)

(56) References Cited

U.S. PATENT DOCUMENTS

| | | | | |
|---|---|---|---|---|
| 7,261,810 | B2 * | 8/2007 | Argo | F17D 1/088 208/177 |
| 7,417,009 | B2 | 8/2008 | Shmakova-Lindeman | |
| 8,114,819 | B2 | 2/2012 | Becker | |
| 8,123,930 | B2 | 2/2012 | Cohrs et al. | |
| 8,134,011 | B2 | 3/2012 | Rivers et al. | |
| 8,336,624 | B2 | 12/2012 | Becker et al. | |
| 8,404,895 | B2 | 3/2013 | Tian et al. | |
| 8,822,386 | B2 * | 9/2014 | Quintero | C09K 8/032 507/117 |
| 2004/0058827 | A1 | 3/2004 | Jennings | |
| 2006/0046937 | A1 | 3/2006 | Fu et al. | |
| 2006/0272816 | A1 | 12/2006 | Willberg et al. | |
| 2007/0062698 | A1 * | 3/2007 | Smith | C09K 8/035 166/279 |
| 2010/0056399 | A1 * | 3/2010 | Berkland | C09K 8/516 507/201 |
| 2010/0105580 | A1 | 4/2010 | Becker | |
| 2010/0234503 | A1 | 9/2010 | Khabashesku et al. | |
| 2012/0015852 | A1 * | 1/2012 | Quintero | C09K 8/032 507/112 |
| 2013/0196883 | A1 * | 8/2013 | Rincon-Torres | C09K 8/70 507/112 |
| 2013/0274149 | A1 * | 10/2013 | Lafitte | C09K 8/905 507/112 |
| 2013/0296618 | A1 * | 11/2013 | Sandu | A01N 59/00 585/3 |
| 2014/0305649 | A1 | 10/2014 | Tang et al. | |
| 2014/0349894 | A1 * | 11/2014 | Quintero | C09K 8/032 507/110 |
| 2015/0129225 | A1 * | 5/2015 | Ghorbani | C09K 8/528 166/304 |
| 2015/0368541 | A1 * | 12/2015 | Monclin | C09K 8/68 507/108 |
| 2016/0160119 | A1 * | 6/2016 | Cannan | C09K 8/70 166/280.2 |
| 2017/0058186 | A1 * | 3/2017 | Oghena | C09K 8/58 |

FOREIGN PATENT DOCUMENTS

| | | | | |
|---|---|---|---|---|
| EP | 2352805 | A1 | 4/2010 | |
| WO | WO-9419575 | A2 * | 9/1994 | C09K 8/524 |
| WO | 2010/045520 | A1 | 4/2010 | |
| WO | 2013/090347 | A1 | 6/2013 | |
| WO | 2013/182852 | A1 | 12/2013 | |
| WO | 2014/085770 | A1 | 6/2014 | |

OTHER PUBLICATIONS

International Search Report and Written Opinion issued in related International Application No. PCT/US2015/056231 dated Dec. 28, 2015 (14 pages).

Examiner's Report for the equivalent Canadian patent application 2964328 dated Mar. 19, 2018.

Aiyejina et al., Wax formation in oil pipelines: A critical review. International Journal of Multiphase Flow. 2011, 37, pp. 671-694.

Rudakova et al., Changes in rheological properties of crude oil upon treatment with urea. Translated from Khimiya i Tekhnologiya Topliv Masel. 1983, 4, pp. 21-23.

Pulikkathara et al., Sidewall covalent functionalization of single wall carbon nanotubes through reactions of fluoronanotubes with urea, guanidine, and thiourea. Chem. Mater. 2008, 20, pp. 2685-2695.

Bacon et al., Optimizing paraffin and napthene wax-treatment options using cross-polarized microscopy. SPE 140838. Society of Petroleum Engineers. The Woodlands, TX Apr. 11-13, 2011, 7 pages.

Abdallah et al., "Study of Asphaltene Adsorption on Metallic Surface Using XPS and ToF-SIMS", J. Phys. Chem. C. 112 (2008) 18963-18972.

Pulikkathara et al., Medium density polyethylene composites with functionalized carbon nanotubes. Nanotechnology, vol. 20 (2009), No. 19, 14 pages.

* cited by examiner

Wax
Wax inhibitor
Carbon nanotube

Oil

Oil + nanotubes

Oil + modified nanotubes

Oil + wax inhibitor

Oil + wax inhibitor + nanotubes

Oil +wax inhibitor + modified nanotubes

CHEMICAL INHIBITORS WITH SUB-MICRON MATERIALS AS ADDITIVES FOR ENHANCED FLOW ASSURANCE

CROSS-REFERENCE TO RELATED APPLICATIONS

This Application claims priority, pursuant to 35 U.S.C. § 119(e), to U.S. Provisional Patent Application Ser. No. 62/065,321, filed on Oct. 17, 2014, which is incorporated by reference in entirety.

BACKGROUND

In the oil and gas industry, fluids produced from subterranean formations often contain varying levels of hydrocarbons, associated aqueous phases, and dissolved and suspended solids. During production operations, hydrocarbons may be depressurized and cooled during capture and various flow assurance challenges can arise that may negatively affect production and other downstream processes. Among these considerations, it may be important to control of precipitation and deposition of solids such as hydrates, waxes, organic and inorganic scales, asphaltenes, corrosion products, and formation solids.

Solids present in hydrocarbon-containing produced from subterranean formations may be only slightly soluble at reservoir pressure and temperature. As produced fluids undergo pressure and temperature changes during production, solids may precipitate from the fluids and deposit on downhole tools, pipe wall surface, tubes, tanks, and other equipment. Solid deposition may cause additional operational problems such as poor oil and water separation, increased fluid viscosity, and pressure drops in the production and transportation pipelines; all of which can cause reductions in output and substandard oil and water quality.

In prior approaches, problems of solid deposition have been resolved by deploying a variety of physical and chemical methods. Deposition mitigation by chemical methods may involve the use of dispersants, solvents, inhibitors, and other additives that alter the size and shape of the particles responsible for the formation of deposits. For example, chemical additives may operate by disrupting the growth of solid particles or other crystalline materials, leading to a decrease in the average size of these insoluble impurities and inhibiting precipitate formation. In addition, chemical additives may also disperse deposited solids and remediate scale and wax buildup.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that include admixing an additive composition with a hydrocarbon fluid, wherein the additive composition contains at least one inhibitor and at least one sub-micron particle.

In another aspect, embodiments disclosed herein relate to methods that include providing an additive composition containing at least one inhibitor and at least one sub-micron particle; adding the additive composition to a fluid capable of precipitating at least one of at least of asphaltenes, wax, scale, and gas hydrates; and transporting the fluid containing the additive composition.

In yet another aspect, embodiments disclosed herein relate to methods of drilling that include providing a drilling fluid containing a base fluid and additive composition comprising at least one inhibitor and at least one sub-micron particle; drilling a wellbore using the drilling fluid; and allowing the additive composition inhibit the precipitation of at least one of asphaltenes, wax, scale, and hydrates in at least a portion of the wellbore.

Other aspects and advantages of the invention will be apparent from the following description and the appended claims.

BRIEF DESCRIPTION OF DRAWINGS

The subject disclosure is further described in the detailed description which follows, in reference to the drawings by way of non-limiting examples of the subject disclosure.

DETAILED DESCRIPTION

Figure 1:
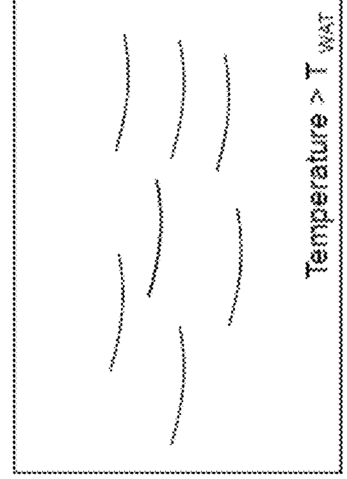
FIGS. 1-9 illustrate proposed mechanisms of deposit formation and inhibition in accordance with embodiments disclosed herein.

Embodiments disclosed herein are directed to compositions for and associated methods of controlling deposition and flow properties of hydrocarbon fluids. The present disclosure is directed to additive compositions containing at least one sub-micron material and at least one inhibitor for controlling and/or preventing the formation of aggregates or other precipitates in hydrocarbon fluids. Depending on the selection of the constituent components, additive compositions may be formulated as a versatile inhibitor treatment to address a number of standard industry issues including scale formation, hydrate formation, asphaltene or wax deposition, or corrosion inhibition.

Fluids produced from oil wells known as formation fluids contain components that may lead to asphaltene, wax, hydrate, or scale deposition on equipment and tubing that is used to transport the fluids. Deposition can reduce the available pipeline area and lead to lower production rates, thus various types of inhibitors may be added to produced fluids to control deposition and prevent reduced pipeline flow.

Deposition in the pipelines may be problematic for transport and upstream applications. Blockages formed from precipitates not only reduce production capacity but may lead to higher pumping costs and non-productive time spent treating blockages. Current treatment methods to mitigate blockages may include mechanically pigging out the pipes, heating the pipelines, adding insulation to prevent heat loss, and preventing deposition formation by adding various chemical inhibitors, solvents, or dispersants.

Additive compositions in accordance with embodiments described herein may be added to hydrocarbon fluids to mitigate the effects of undesirable precipitation and subsequent deposition. When added to hydrocarbon fluids, additive compositions may stabilize poorly soluble components, delaying or eliminating their precipitation, which may lead to reduced deposition. For example, hydrocarbon fluids may include wax-containing oils and paraffin-containing fluids such as liquid natural gas, crude oil, shale oil, petroleum, tar sands oil, and the like. In one or more embodiments, additive compositions containing sub-micron materials and inhibitors may produce a complementary or synergistic effect that inhibits deposition formation.

During application, the constituents of the additive compositions may be mixed together prior to addition to a hydrocarbon fluid in some embodiments, or added sequentially to the hydrocarbon fluid in other embodiments. Further, in one or more embodiments, additive compositions may be injected from a surface source into wells or into flow lines to treat formation fluids to prevent or control precipitation.

In one aspect, embodiments of the instant disclosure directed to the treatment of wax formation in hydrocarbon fluids may be used to decrease the aggregation of paraffinic molecules and changing paraffin crystal morphology. Wax deposition is a temperature driven process in which poorly soluble hydrocarbons precipitate from solution as the temperature falls below the wax-appearance temperature (WAT). For example, when the temperature of a hydrocarbon fluid is above the WAT, wax-forming molecules remain soluble and mobile during transport. At the WAT, waxes begin to aggregate and precipitate out of solution. Below the WAT, formed aggregates and/or crystals may grow larger and migrate to pipe walls and form deposits that can impede flow and decrease production rate. As the temperature of the surrounding hydrocarbon cools and waxes precipitate, viscosity may increase as a function of decreasing temperature.

In one or more embodiments, additive compositions may inhibit wax formation by changing the crystal morphology and intermolecular interaction of wax molecules and other slightly soluble species. While not limited by any particular theory, it is proposed that this effect is due in part to an interaction between the wax inhibitor the sub-micron materials that alters the crystal structure of forming waxes. As a result, the formation of dense wax crystals and aggregates that lead to deposition is reduced.

Figure 2:
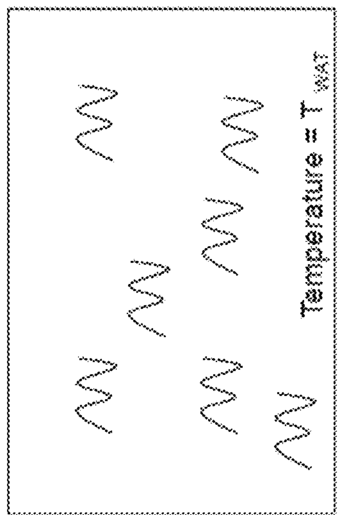
Figure 3:
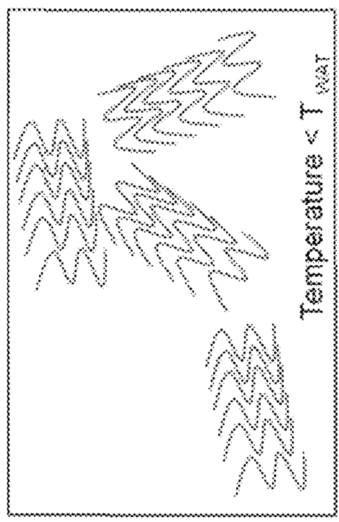

As illustrated in FIGS. 1-3, a schematic of a hydrocarbon fluid containing wax molecules is shown. As the temperature decreases from left to right, the formation of crystalline wax is observed. In FIG. 1, above the wax appearance temperature (WAT), wax molecules are predominantly in an extended conformation that remains soluble in the surrounding fluid. As the temperature approaches the WAT in FIG. 2, the molecules the wax molecules begin to collapse and adopt a larger number of stable folded chain configurations. As the molecules begin to fold and exclude solvent, they become less soluble and may begin to aggregate or form wax crystals. As the temperature falls below the WAT, as shown in FIG. 3, the wax molecules readily precipitate and form crystalline wax particles that increase viscosity in the short term, and precipitate out of solution as the density of the particles increases. Precipitation may also occur as wax containing fluids come into contact with surfaces that are below the WAT. Surfaces below WAT act as heat sinks when contacted with fluids, which accelerates wax crystal formation and the rate of deposition onto these surfaces.

Figure 4:
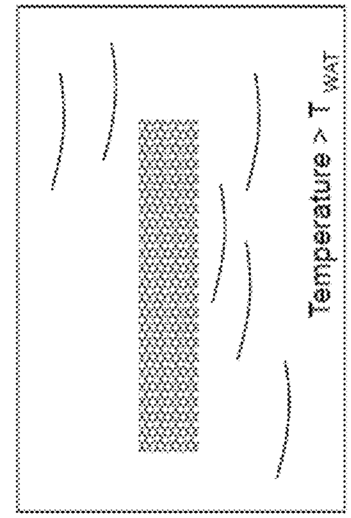
Figure 5:
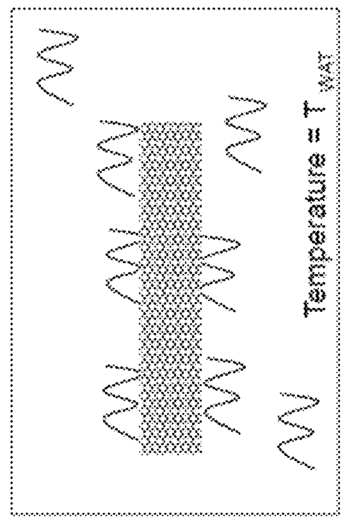
Figure 6:
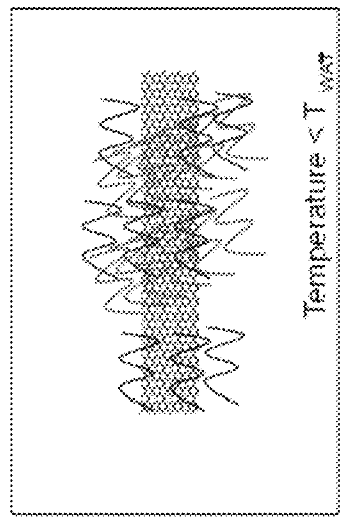

In FIGS. 4-6, a schematic of a hydrocarbon fluid containing paraffin being treated with, carbon nanotubes, a sub-micron material. In FIG. 4, while the temperature is above the WAT, all components remain in solution. As the fluid approaches the WAT in FIG. 5, the large hydrophobic surface area of the nanotubes attracts the poorly soluble wax molecules as aggregates begin to form. As shown in FIG. 6, above the WAT, nanotube and wax aggregates act as nucleation centers as the continued addition of wax molecules begins to form larger crystals that eventually precipitate out of solution.

Figure 9:
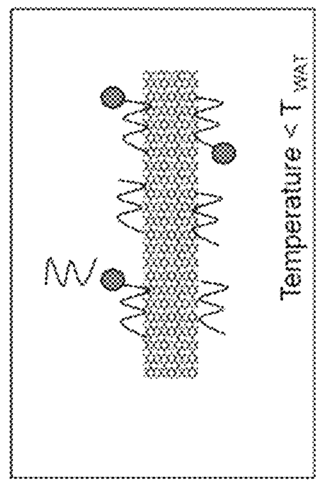
Figure 8:
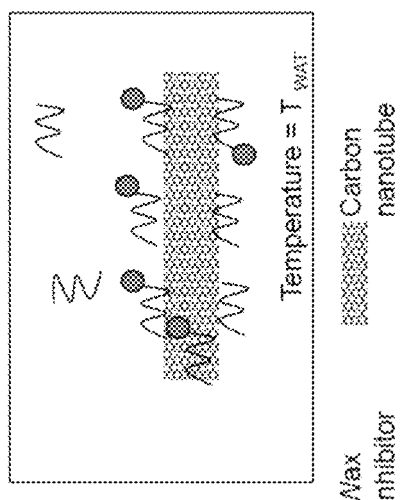
Figure 7:
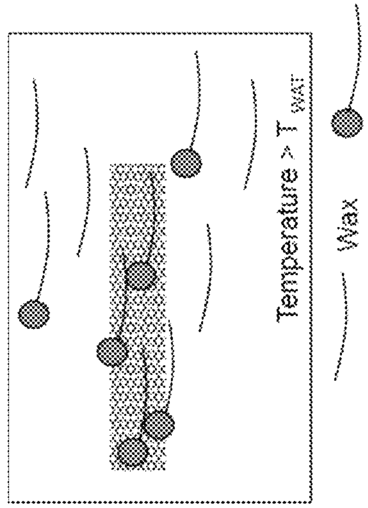
Figure 10:
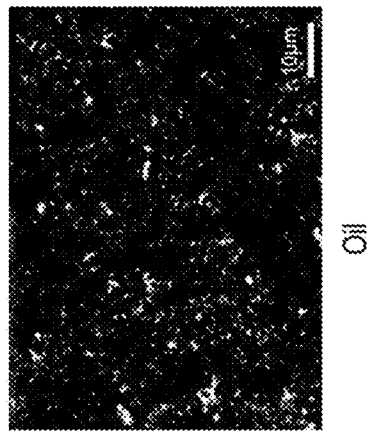
FIG. 10-15 illustrate cross polarized microscopy images of a waxy oil containing various additives in accordance with embodiments disclosed herein.

In FIGS. 7-9, a schematic of a hydrocarbon fluid containing paraffin being treated with an additive composition containing a paraffin inhibitor and a sub-micron material (in this case carbon nanotubes). In FIG. 7, while the temperature is above the WAT, all components remain in solution. As the fluid approaches the WAT in FIG. 8, the large hydrophobic surface area of the nanotubes attracts the poorly soluble wax molecules, preventing the formation of wax crystals and increasing the exposure of the wax molecule to association with inhibitors in solution. As shown in FIG. 9, because of the added effect of the inhibitor in solution and the competition that exists between wax molecules nucleating on the large surface area of the nanotube and the likelihood of encountering another wax molecule or crystal, the formation of wax crystals may be significantly reduced, even at lower temperatures. It is noted, however, that while the schematics presented above focus on the treatment of paraffin wax formation, the same principles may be applied to the treatment of other deposition process that involve the accumulation of poorly soluble molecules on the surface of sub-micron materials.

In one or more embodiments, additive compositions in accordance with the present disclosure may be admixed with a hydrocarbon-containing fluid or other wellbore fluid that may vary according to a number of factors that may include the base fluid type, the paraffin content in the fluid, the carbon number distribution of the fluid, the type of inhibitor added, the degree of wax appearance temperature and viscosity corrections desired, the ambient conditions, presence of aqueous phases, etc. The optimum dosage rate may be estimated by a number of laboratory measurements such as wax appearance temperature, viscosity, gel strength, wax deposition tendency, etc. Therefore, there are no limitations in this regard.

In some embodiments, drilling methods known in the art may be adapted to include a drilling fluid that contains an additive composition in accordance with the present disclosure. Drilling fluid formulations may also contain additive compositions that are formulated depending on the demands of the particular formation. For example, a drilling fluid may be formulated to treat a broad spectrum of deposition processes by combining one or more inhibitors with a sub-micron material in some embodiments, or tailored more narrowly for specific treatment of a particular problem encountered downhole such as hydrate formation, asphaltene or wax deposition, etc. It is also envisioned that additive compositions in accordance with the present disclosure may be used in a number of other subterranean operations susceptible to deposition processes such as, for example, fracturing, gravel packing, and cementing. Particularly when these operations take place in low temperature environments or in the presence of fluids containing significant amounts of paraffinic hydrocarbons.

Methods in accordance with the present disclosure may include admixing an additive composition with a hydrocarbon fluid in an effective amount, i.e., an amount sufficient to produce some reduction in the appearance of waxes or poorly soluble aggregates at decreased temperatures as compared to an untreated fluid. For example, additive compositions may be added at a concentration that may range from a lower limit selected from any of 0.0001 percent by weight (wt %), 0.001 wt %, 0.1 wt %, 1 wt %, and 2 wt % to an upper limit selected from any of 1 wt %, 2 wt %, 5 wt %, 10 wt %, and 15 wt %, where the concentration of the additive composition may range from any lower limit to any upper limit. In yet other embodiments, the concentration of the additive composition may range from about 0.001 wt % to about 10 wt %. However, one skilled in the art would appreciate that the desired concentration of additive composition may depend on the type of fluid being treated, and that the desirable amount is an amount sufficient to achieve the highest variance in wax appearance temperature and viscosity at the lowest reasonable dosage.

Sub-Micron Materials

In one aspect, additive compositions in accordance with the present disclosure may include a mixture of one or more inhibitors and a sub-micron material. While not bound to a particular theory, it is envisioned that sub-micron material may provide a relatively large surface area that attracts other particulate-forming species. For example, the surface of sub-micron materials may act as a nucleation center for poorly soluble species such as waxes and induce the formation of aggregates or crystals. Further, in embodiments containing a combination of sub-micron materials and inhibitors, combinations may exhibit synergism that effectively reduces the cloud point of hydrocarbon fluids to a greater degree that either component alone.

In one or more embodiments, sub-micron materials in accordance with the present disclosure may be formed from the carbon allotrope graphene, a planar array of $sp^2$ bonded carbon atoms that form an interconnected "honeycomb" network of five-, six- and seven-membered rings. In one or more embodiments, sub-micron materials may include carbon-based materials such as, for example, graphene, graphene oxide, glassy carbon, carbon nanofoam, carbon black, silicon carbide, buckminsterfullerene, buckypaper, nanofiber, nanoplatelets, nano-onions, nanoribbons, nanohorns, single- or multi-walled carbon nanotubes, and derivatives thereof.

Carbon nanotubes (CNTs) that may be used in accordance with embodiments of the present disclosure, include, but are not limited to, modified and unmodified: single-walled carbon nanotubes (SWNTs), multi-walled carbon nanotubes (MWNTs), double-walled carbon nanotubes (DWNTs), buckytubes, fullerenes, tubular fullerenes, graphite fibrils, and combinations thereof. Such CNTs can be made by any known technique including, but not limited to the HiPco RTM process, arc discharge, laser oven, flame synthesis, chemical vapor deposition, wherein a supported or an unsupported metal catalyst may also be used, and combinations thereof. Depending on the embodiment, the CNTs can be subjected to one or more processing steps prior to subjecting them to any of the processes described in the present disclosure. In some embodiments, the CNTs have been purified. The terms "nanotube," "carbon nanotube," "CNT," and "NT" are used synonymously herein.

In one or more embodiments, carbon-based sub-micron materials may be functionalized to improve compatibility with a given hydrocarbon fluid or to modify other fluid properties such as rheology or temperature stability. In some embodiments, sub-micron materials may be activated or made more reactive to subsequent reactions by reacting graphenic carbons with an activating agent through halogenation to prepare halogenated sites that may be reacted later with selected nucleophiles. For example, fluoronanotubes prepared by direct fluorination of carbon-based sub-micron materials are versatile precursors for preparation of a number of functionalized derivatives through a nucleophilic substitution of fluorine. Further, activated carbon-based sub-micron materials may be derivatized due to a higher reactivity than unmodified materials.

In other embodiments, sub-micron materials may include graphenic materials that have been modified with amino compounds following activation with an activating agent. In a particular embodiment, the amino compound may be urea. Urea is a chaotropic substance that has been used in the past to treat waxy oils reducing the WAT of oil from 19° C. to 3° C. and −12° C. with additions of 20 and 30% of urea, respectively. Similarly, sub-micron materials modified with urea may also be used in a number of applications with other inhibitors for asphaltene, hydrates, and emulsions as well. Modification of sub-micron materials with urea has also been found to improve the overall solubility and dispersibility of sub-micron materials that ordinarily have a tendency to form insoluble aggregates that exclude solvents. Without being bound by a particular theory, it is envisioned that urea may intercalate into aggregates of sub-micron materials and disrupt Van der Waals forces that prevent solvation, reducing bundle size and preventing precipitation or settling-out of newly dispersed materials.

In one or more embodiments, the sub-micron materials may also include microscopic or nanoscopic cellulose particles containing crystalline, semi-crystalline, or non-crystalline cellulose. In particular embodiments, the sub-micron material may be nanocrystalline cellulose (NCC), also referred to as cellulose nanocrystals, cellulose whiskers, cellulose fibrils, or cellulose rod-like nanocrystals, which can be obtained from cellulose fibers. However, cellulose nanocrystals may have different shapes besides rods. Examples of these shapes include any nanocrystal in the shape of a 4-8 sided polygon, such as a rectangle, hexagon, or octagon. NCCs are generally made via the hydrolysis of cellulose fibers from various sources such as cotton, wood, wheat straw and cellulose from algae and bacteria. These cellulose fibers are characterized in having two distinct regions, an amorphous region and a crystalline region. In embodiments, NCC can be prepared through acid hydrolysis of the amorphous regions of cellulose fibers that have a lower resistance to acid attack as compared to the crystalline regions of cellulose fibers. Consequently, NCC particles with "rod-like" shapes (which may be referred to as "rod-like nanocrystalline cellulose particles" or more simply "NCC particles") having a crystalline structure are produced. In embodiments, the hydrolysis process may be conducted under mild conditions such that the process does not result in any considerable degradation or decomposition rod-like crystalline portion of the cellulose.

In other embodiments, chemical modifications may involve electrophiles that are site-specific when reacting with hydroxyl groups on NCC or NCC particle surfaces. For instance, such electrophiles may be represented by a general formula such as, for example, RX, where "X" is a leaving group that may include a halogen, tosylate, mesylate, alkoxide, carbodiimide adduct, hydroxide, or the like, and "R" may contain alkyl, silane, amine, ether, ester groups and the like. In embodiments, surface functionalization with such electrophiles may be performed in a manner that does not decrease the size or the strength of the NCC or NCC particle.

The addition of functional groups may generally improve the dispersibility of the above described sub-micron materials in hydrocarbon-containing liquids. Such functional groups may include: alkyl, cycloalkyl, hydroxyl alkyl, amino alkyl, haloalkyl, alkenyl, alkynyl, sulfate, sulfonate, carboxy, benzenesulfonate, amines, alkyl amines, nitriles, quaternary amines, and the like. In addition, water or oil soluble polymers or polymerizable moieties may be grafted onto the surface of the sub-micron materials.

Sub-micron materials useful in accordance with the present disclosure may also include micro- and nano-scale minerals such as colloidal silicas, hydroxyapatite, calcium tertiary phosphate, calcium oxide, zinc oxide, silicon oxide, aluminum oxide, magnesium oxide, or calcium fluoride.

Sub-micron materials may be incorporated at a percent by weight (wt %) that ranges from a lower limit selected from any of 0.0001 wt %, 0.001 wt %, 0.1 wt %, 1 wt %, and 2 wt % to an upper limit selected from any of 1 wt %, 2 wt %, 5 wt %, 10 wt %, and 15 wt %, where the concentration of the sub-micron material may range from any lower limit to any upper limit.

Inhibitors

Depending on the desired application, additive compositions of the present disclosure may contain one or more inhibitors or types of inhibitors know in the art and used to treat scale formation, hydrate formation, asphaltene or wax deposition, and the like.

In one or more embodiments, inhibitors may contain alkyl chains or other hydrophobic domains that that associate with weakly soluble species and prevent aggregate or crystal formation. For example, inhibitors may be structured so that part of the molecule contains a long-chain alkyl group soluble in the paraffin-containing fluid (paraffin-like part), while the other part of the structure contains a polar dispersant group (polar part). The paraffin-like part may provide nucleation sites and may co-crystallize with the paraffins in the paraffin-containing fluid, while the polar part may incorporate on the surface of the paraffin crystals thus inhibiting the extensive crystal growth by reducing the size of the paraffin crystals.

At the temperature of the reservoir, hydrocarbons may be primarily liquid or gaseous. As the production stream rises to the surface and leaves the wellhead, the temperature and pressure start to decrease; the stream begins to cool from the elevated temperature and pressure as compared to the temperature and pressure of the wellhead. This chilling may have a number of effects, including gelling, undesirable rheology changes, or deposition of waxes, asphaltenes, etc., which may affect downstream production operations. The wax deposits formed may contain n-paraffins (linear alkanes) and small amounts of branched or isoparaffins and aromatic compounds (cycloparaffins, naphthalenes). The carbon number of paraffinic molecules present in wax deposits is may be $C_{15}$ or higher and may reach up to $C_{80}$. Studies have also indicated that the quantity of wax formation that will prevent flow or gel for an oil is quite small.

In some embodiments, additive compositions of the present disclosure may be suitable for reducing the wax appearance temperature of wax-containing hydrocarbon fluids containing high molecular weight linear paraffins, i.e., paraffins having at least 20 carbon atoms. Further, additive compositions may be used for treating fluids containing high molecular weight linear paraffins such as those containing 25 carbon atoms or more.

Inhibitors may include copolymers containing a mixture of monomers that form linear polymers such as ethylene and monomers having alkyl chains of varying length in some embodiments. For example, inhibitors may be copolymers of ethylene and butene or copolymers of ethylene and propylene. In other embodiments, the inhibitor may be a copolymer such as ethylene alpha-olefin copolymers. Examples of olefin co-monomers may include propylene, n-butene, isobutene, n-octene-1, isooctene-1, n-decene-1, and n-dodecene-1. The copolymer may also include small amounts, e.g., up to 10% by weight, of other copolymerizable monomers, for example olefins other than alpha-olefins, and non-conjugated dienes.

Inhibitors in accordance with embodiments of the present disclosure may also include copolymers having cyclic amides as well as long-chain alkyl groups. The cyclic amide functionality may be achieved from a cyclic amide monomer, which may be reacted with at least one other monomer to form the copolymer. Exemplary cyclic amides, also referred to as lactams, that may be used as monomers in forming the copolymer may include vinylpyrrolidone ($CH_2{=}CH{-}C_4H_6NO$), a five-membered lactam ring, vinylcaprolactam ($CH_2{=}CH{-}C_6H_{10}NO$), a seven membered lactam ring, etc.

In some embodiments, inhibitors may be prepared by reacting a cyclic amide with alpha-olefin monomers. Alpha-olefins (or α-olefins) are a family of organic compounds which are alkenes with a chemical formula $C_xH_{2x}$, distinguished by having a double bond at the primary or alpha (α) position ($CH_2{=}C_{x-1}H_{2(x-1)}$). There are at least two types of alpha-olefins, branched and linear (or normal). The chemical properties of branched alpha-olefins with a branch at either the second or the third carbon are significantly different from the properties of linear alpha-olefins and those with branches on the fourth carbon number and further from the start of the chain. In particular embodiments of the present disclosure, the alpha-olefin of at least one copolymer is a linear alpha-olefin. Alpha-olefins suitable for reaction with the cyclic amide may include any $C_2$-$C_{40}$ hydrocarbon having an α-β double bond.

Alternatively, the long-chain alkyl groups may be formed by use of an α-β unsaturated monomer that may be subsequently modified through reaction with an alkylated nucleophile. For example, such unsaturated monomers may include vinyl acrylates, maleic anhydride, and 1,2-ethylenedicarboximide, etc. Upon reaction of an unsaturated monomer with a suitable comonomer, the resulting polymer may be transesterified, in the case that the unsaturated monomer is an acrylic acid for example, with a long chain aliphatic alcohol. Further, one skilled in the art would appreciate that similar types of reactions may occur with maleic anhydride or maleimide to achieve the long chain alkyl functionality.

In some embodiments, inhibitors may contain polymers that have been transesterified poly(methyl acrylate) such that the resulting polymer is a methyl acrylate-alkyl acrylate or methyl methacrylate-alkyl methacrylate. Further, it is within the scope of the present disclosure that any of the ester groups may be linear or branched. For example, the alkyl groups of the alkyl-acrylate polymers may include at least 12 carbon atoms. The alkyl groups may include 12 to 40 carbon atoms in some embodiments of the present disclosure, and 20 to 60 carbon atoms in other embodiments.

In some embodiments of the present disclosure, inhibitors may be ethylene-vinyl acetate (EVA) copolymers, vinyl acetate-olefin copolymers, polyalkyl(meth)acrylates, alkyl esters of styrene-maleic anhydride copolymers, olefin-maleic anhydride copolymers, alpha olefin-maleic anhydrides, esters of alpha olefin-maleic anhydrides, alkyl esters of unsaturated carboxylic acid-olefin copolymers, alkyl acrylate-alkyl maleate copolymers, alkyl fumarate-vinyl acetate copolymers, alkyl phenols, alpha-olefin copolymers, alkylated polystyrenes, alkylated naphthalenes, ethylene-vinyl fatty acid ester copolymers, or long-chain fatty acid amides.

Hydrate Inhibitors

In one or more embodiments, additive compositions may be added to a hydrocarbon fluid to prevent the formation of gas hydrates. Gas hydrates may be a problem encountered in cold climates, deepwater environments, or at any point in a gas system where the gas experiences rapid expansion. As this lattice expands and gains mass, it can block tubing, flow lines, pipelines, or any conduit through which produced gas flows such as a drill string or a blow out preventer.

Hydrates may form when a non-polar molecule interacts with an aqueous phase and hydrogen bonding between neighboring water molecules form a cage-like structure or clathrate around the non-polar molecule. A hydrocarbon hydrate generally is composed of crystals formed by a lattice of water host molecules surrounding the hydrocarbon non-polar guest molecules. The lattice structure formed from the water molecules is thermodynamically unstable and is only stabilized by the incorporation of guest molecules. Depending on pressure and gas composition, these ice-like compounds can exist even beyond the freezing point of water (up to above 25° C.).

Hydrates inhibitors may work disrupting forming hydrate crystals, slowing the formation and growth of gas hydrates and thereby increase the stability of hydrate-forming fluids at lower temperatures, in addition to allowing for longer times to transport fluids and/or produce fluids from a wellbore.

In one or more embodiments, inhibitors in accordance with the present disclosure may be polymeric hydrate inhibitors that include polyethyleneoxide, poly-N-vinylpyrrolidone, polyvinylcaprolactam, poly-N-methyl-N-vinylacetamide, poly-N-vinylvalerolactam, poly-acryloylpyrrolidine, and the like. In other embodiments, hydrate inhibitors may be copolymers of alkoxylated acrylic or methacrylic acid derivatives, and copolymers of butadiene and styrene.

Scale Inhibitors

Additive compositions in accordance with the present disclosure may contain one or more scale inhibitors that may inhibits the nucleation, growth, and deposition of scale on downhole surfaces. Scaling or scale formation generally involves the precipitation and deposition of dense materials on surfaces made of metal and other materials. Scale formation may cause a number of operational problems, including but not limited to, plugging of equipment, pressure loss, increased utility costs, reduced heat exchange capacity, corrosion, lost production due to downtime, and downgraded products from insufficient feeds.

Scale formation may occur when inorganic mineral salts (such as, for example, calcium carbonates, calcium sulfates, calcium oxalates, and barium sulfates) precipitate from liquids and deposit on the inside surfaces of a system (such as, for example, boilers, evaporators, reactors, cooling water systems, heat exchangers, pipes, filter cloths, reverse osmosis membrane surfaces, oil wells, and desalination evaporators). Scale build-up within wellbore equipment shortens equipment useful life and can plug production tubing.

In one or more embodiments, inhibitors may also inhibit scale through disruption of the nucleation process through physical disruption. In other embodiments, inhibitors may also include side groups that bind or chelate metal ions, or otherwise increase metal capacity of the solution, such as amines, carboxylic acids, aminopolycarboxylic acids, and the like.

Inhibitors in accordance with the present disclosure may be employed alone, or may be used in combination with one or more additives for improving low temperature mobility and/or other properties that are in use in the art or known from the literature. Such additives may for example be oxidation inhibitors, corrosion inhibitors, detergents, storage stabilizers, lubricity agents, and pour point depressants.

Further, it is also within the scope of the present disclosure that the additive compositions of the present disclosure may be combined with one or more other inhibitors or types of inhibitors. For example, one skilled in the art would appreciate that use of multiple inhibitors may be particularly suitable when treating fluids containing paraffin of wide ranging size (i.e., carbon length). It is also conceived that inhibitors may be produced that are broad spectrum inhibitors that inhibit a number of deposition processes, such as an inhibitor that is useful both as a paraffin inhibitor and a hydrate inhibitor for example.

In some embodiments, additive compositions may be used to lower the WAT of a hydrocarbon fluid by at least 3° C. In other embodiments, the WAT variation may be by an amount that ranges from about 3° C. to about 50° C., and from about 3° C. to about 10° C. in other embodiments. One skilled in the art would appreciate that any depressant effect may be desirable, particularly in the treatment of heavy oils with high content of $C_{18+}$n-paraffins.

In one or more embodiments, inhibitors may be added to a hydrocarbon fluid at a percent by weight (wt %) that may range from a lower limit selected from any of 0.0001 wt %, 0.001 wt %, 0.1 wt %, 1 wt %, and 2 wt % to an upper limit selected from any of 1 wt %, 2 wt %, 5 wt %, 10 wt %, and 15 wt %, where the concentration of the inhibitor may range from any lower limit to any upper limit.

Combination of sub-micron materials and inhibitors may be utilized in accordance with embodiments of the present disclosure, and may exhibit a synergistic affect that reduces the wax appearance temperature of hydrocarbon fluids to a greater degree that either component alone. In one or more embodiments, the ratio of sub-micron material to inhibitor, where sub-micron materials are measured by weight and inhibitor is measured by volume (ratio of wt/vol), may range from 0.01:10 to 5:10 in some embodiments, and from 0.1:10 to 2:10 in other embodiments.

EXAMPLES

The present disclosure is further exemplified by the examples below which are presented to illustrate certain specific embodiments of the disclosure but are not intended to be construed so as to be restrictive of the spirit and scope thereof.

Example 1

In a first example, various inhibitor formulations were assayed in order to determine the effect on the WAT of a waxy oil when compared to a control sample. Samples of a waxy oil from Texas where admixed with various additive compositions and imaged using cross polarized microscopy (CPM) to qualitatively measure the formation of wax crystals in oil.

Six samples were compared: an oil control, oil admixed with nanotubes (NT), oil admixed with amino modified NT, oil and an esterified alpha olefin-maleic anhydride wax inhibitor (WI), oil with WI and NT, and oil with WI and amino modified NT. Combinations of WI and NT tested contained 0.1 percent by weight (wt %) NT. Sample additives were batch sonicated and dosed at 500 ppm into oil for viscosity and CPM testing.

Following admixture, samples were equilibrated to ~15° C. and CPM was used to observe the appearance of wax crystals. CPM works by allowing light to pass through two polarized filters set 90° to each other, which would appear black on images taken by a camera every 0.5 seconds, unless a crystalline solid is placed in between. A sample of waxy oil is placed on a glass slide in between these polarized filters, and the microscope stage is temperature controlled. As the hot waxy oil cools down, wax crystals precipitate; the crystal is able to rotate the light past the polarized filter and appears as a bright spot. The temperature is shown on each image that is taken throughout the experiment, thus the WAT is obtained with a ±2° C. error.

Figure 11:
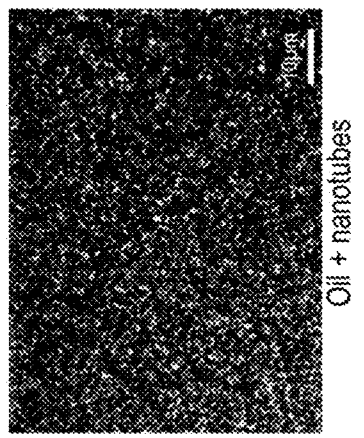
Figure 12:
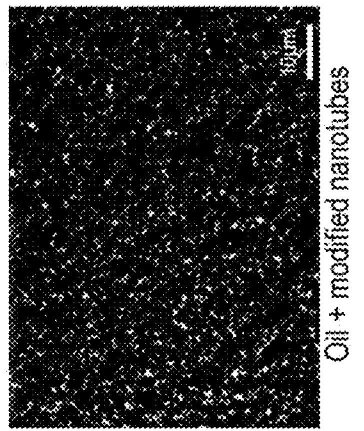
Figure 13:
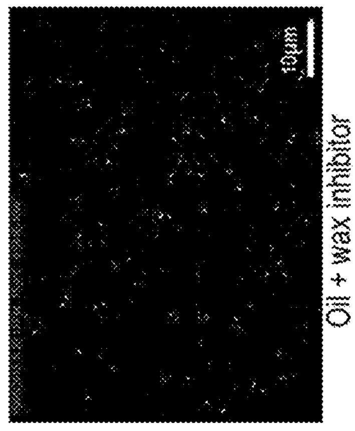
Figure 14:
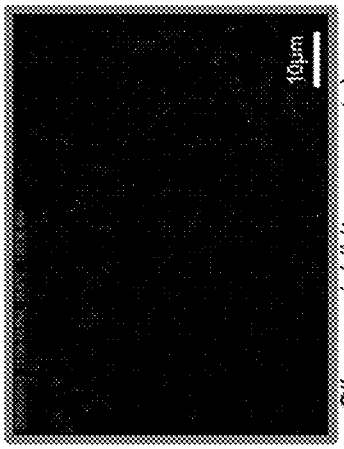
Figure 15:
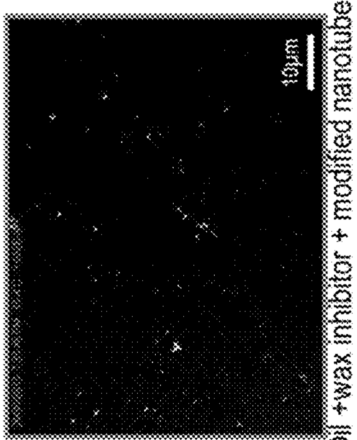

In samples containing mixtures of WI and NT, the size of wax crystals produced at lower temperatures was reduced qualitatively as observed from the CPM images in FIGS. 10-15. The results demonstrate a synergistic interaction of sub-micron carbon based materials, modified with amino-terminal groups and without modification, and an esterified alpha olefin-maleic anhydride wax inhibitor. With particular respect to FIG. 10, a control sample of oil alone shows the appearance of wax crystals that emerge at 15° C. Next, FIGS. 11 and 12 showing oil containing NT additives and oil containing amino modified NT, respectively, exhibit an increased abundance of wax crystals at 15° C. In FIG. 13, a mixture of oil and WI shows a marked decrease of wax crystals compared to the oil control (FIG. 2.1). In FIGS. 14 and 15, mixtures of oil and WI with unmodified or modified NT, respectively, exhibit a reduction of wax crystals at 15° C.

As demonstrated above, a synergistic effect is observed with the mixture of wax inhibitors and sub-micron materials that inhibits or reduces the formation of large aggregate wax crystals at reduced temperatures to a greater degree than either the WI or submicron material additives alone.

Example 2

Figure 16:
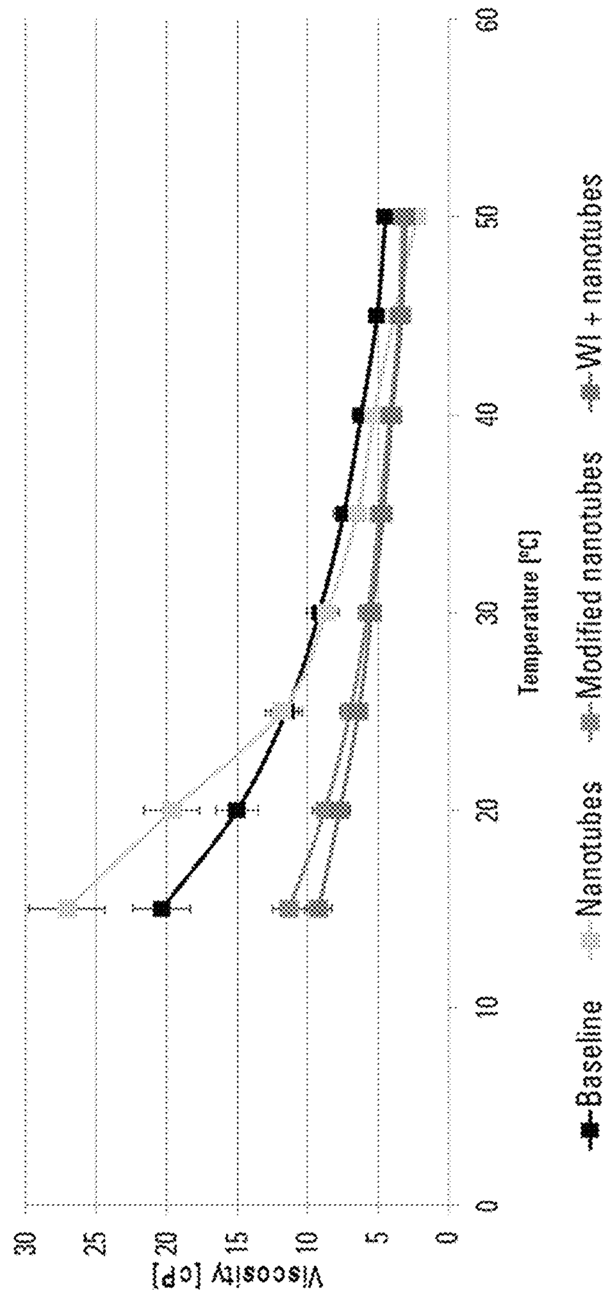
FIG. 16 shows rheological data for a waxy oil containing various additives in accordance with embodiments disclosed herein.

In a second example, the rheology of a waxy base oil is determined after treatment with various additive formulations. With particular respect to FIG. 16, the affect of various additive formulations on the rheology of a waxy oil were compared to the oil's baseline viscosity. Samples assayed included a waxy oil control, waxy oil containing NTs, waxy oil containing amine-modified NTs, and waxy oil a mixture of nanotubes and an esterified alpha olefin-maleic anhydride WI. As show in FIG. 16, samples containing modified NT and a combination of NTs and WI are lower than the waxy oil control and the sample containing NTs alone.

Viscosity data of a heavy oil with asphaltenes treated with WI and NTs also shows a decrease in viscosity compared to the wax inhibitor alone. Further, while the addition of NTs increases the viscosity when added alone, when used in combination with a wax inhibitor there is an observable decrease in viscosity at lower temperature. Viscosity was measured using ATS cup and bob geometry. A sample of the waxy oil was placed in a cup that was temperature controlled. A rotating bob was placed into this cup and a range of shear rates (10-300 $s^{-1}$) was used to measure the viscosity over a temperature range from 60 down to 15° C. Error for this technique was measured to be within 3% of the values on standards used for calibration. Wax appearance temperature (WAT) was determined by using CPM as described above with respect to Example 1.

Figure 17:
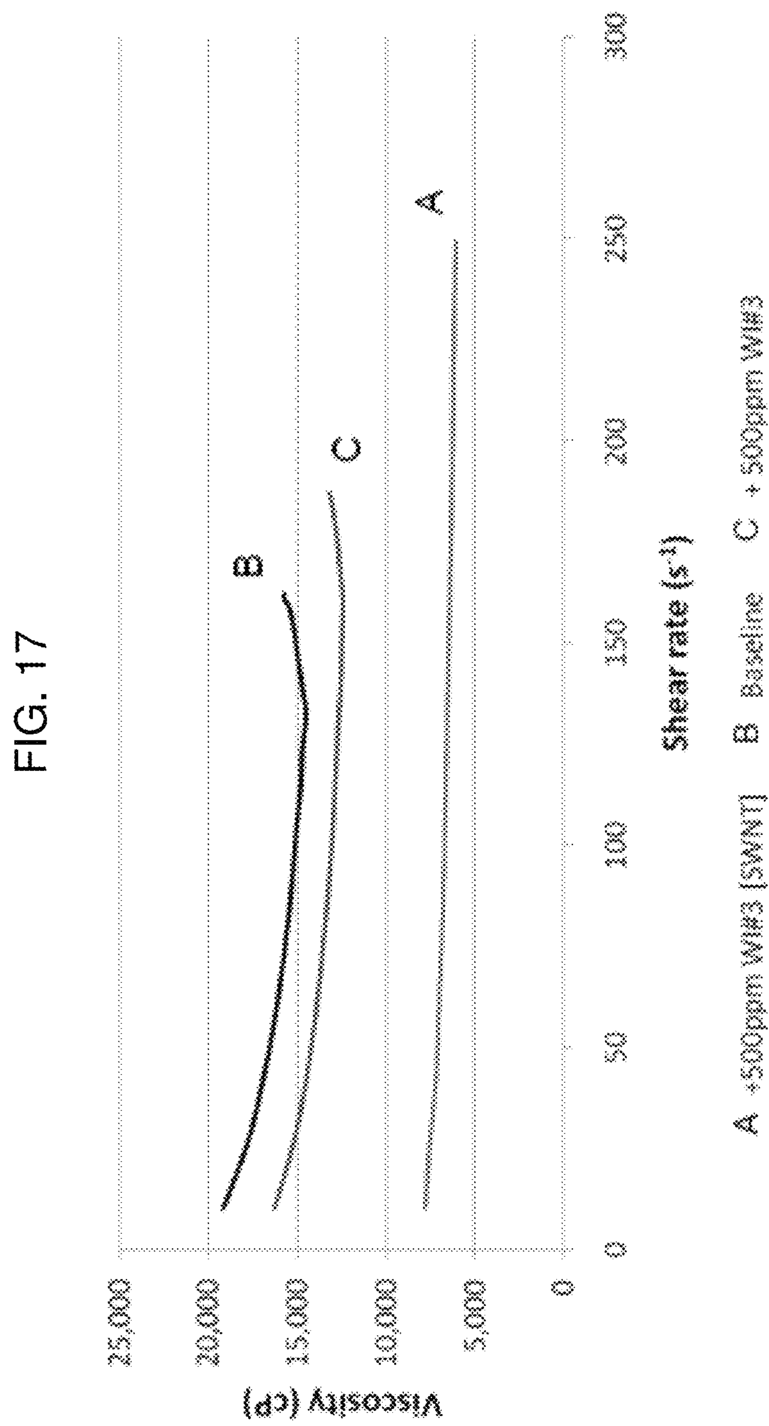
FIG. 17 shows rheological data for an asphaltenic non-waxy oil containing various additives in accordance with embodiments disclosed herein.

With particular respect to FIG. 17, the viscosity and shear rate for a number of samples including a baseline oil sample, a sample containing 500 ppm of a wax inhibitor, and a third sample containing a mixture of esterified alpha olefin-maleic anhydride WI and SWNTs. As the figure demonstrates, a reduction in viscosity occurs with the addition of a wax inhibitor, however, a greater reduction in viscosity is observed with the combination of wax inhibitor and amino-modified nanotubes.

To summarize, additive compositions may be used in conjunction with methods of preventing or treating the production of gas hydrates, wax buildup, or scale in pipelines or on other types of hardware. The ability to suppress precipitate formation at low temperatures may offer reduced costs in preventative measures associated with reducing deposition and reduction in flow rate such as insulation, pigging, and other costs. In addition, methods of the present disclosure may allow for efficient treatment of fluids containing significant amounts of poorly soluble compounds such that deposition is inhibited. Thus, use of the additive compositions of the present disclosure may provide cost effective performance in a wide range of hydrocarbon fluids and applications.

While the disclosure has presented a limited number of embodiments, those skilled in the art, having benefit of this disclosure, will appreciate that other embodiments can be devised which do not depart from the scope of the disclosure as presented herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method comprising:

producing a hydrocarbon fluid from a reservoir;

admixing an additive composition with the hydrocarbon fluid during or after the producing, wherein the additive composition comprises at least one inhibitor and at least one sub-micron particle, the at least one inhibitor and the at least one sub-micron particle being distinct components, wherein the at least one inhibitor is at least one of an asphaltene inhibitor, a hydrate inhibitor or a wax inhibitor, and wherein the at least one sub-micron particle is one or more selected from the group consisting of carbon nanotubes, carbon fibers, fullerenes, graphene particles, microcrystalline cellulose, nanocrystalline cellulose, colloidal silicas, hydroxyapatite, calcium tertiary phosphate, calcium oxide, zinc oxide, silicon oxide, aluminum oxide, magnesium oxide, and calcium fluoride;

wherein the additive composition reduces the deposition or precipitation of at least one of asphaltenes, wax, and hydrates from the hydrocarbon fluid.

2. The method of claim 1, wherein the at least one sub-micron particle is present at a percent by weight (wt %) of the total fluid weight that ranges from 0.001 wt % to 20 wt %.

3. The method of claim 1, wherein the inhibitor is at least one of a hydrate inhibitor or a wax inhibitor.

4. The method of claim 1, wherein the at least one sub-micron particle is functionalized.

5. The method of claim 4, wherein the at least one functionalized sub-micron particle comprises at least one functional moiety selected from a group consisting of amino, amido, urea, carboxylic acid, carbonyl, hydroxyl, alkyl, alcohol, ester, and ether terminal groups.

6. The method of claim 1, wherein a wax appearance temperature of the hydrocarbon fluid is lowered by an amount that ranges from about 3° C. to about 10° C.

7. The method of claim 1, wherein the ratio of sub-micron additive to inhibitor as measured by wt/vol ranges from 0.01:10 to 5:10 wt/vol.

8. The method of claim 1, wherein the at least one sub-micron particle and the at least one inhibitor are separately dispersed in the hydrocarbon fluid.

9. The method of claim 1, wherein the at least one inhibitor and the at least one sub-micron particle are admixed with the hydrocarbon fluid via sequential addition of each of the at least one inhibitor and the at least one sub-micron particle.

10. A method comprising:

providing an additive composition comprising at least one inhibitor and at least one sub-micron particle, the at least one inhibitor and the at least one sub-micron particle being distinct components, wherein the at least one sub-micron particle is one or more selected from the group consisting of carbon nanotubes, carbon fibers, fullerenes, graphene particles, microcrystalline cellulose, nanocrystalline cellulose, colloidal silicas, hydroxyapatite, calcium tertiary phosphate, calcium oxide, zinc oxide, silicon oxide, aluminum oxide, magnesium oxide, and calcium fluoride;

adding the additive composition to a hydrocarbon fluid capable of precipitating at least one of asphaltenes, wax, and gas hydrates, the hydrocarbon fluid having been produced from a reservoir; and transporting the hydrocarbon fluid comprising the additive composition, wherein the additive composition reduces the deposition or precipitation of at least one of asphaltenes, wax, and hydrates from the hydrocarbon fluid.

11. A method comprising:

providing an additive composition comprising at least one inhibitor and at least one sub-micron particle, the at least one inhibitor and the at least one sub-micron particle being distinct components;

wherein the at least one sub-micron particle is one or more selected from the group consisting of carbon nanotubes, carbon fibers, fullerenes, graphene particles, microcrystalline cellulose, nanocrystalline cellulose, colloidal silicas, hydroxyapatite, calcium tertiary phosphate, calcium oxide, zinc oxide, silicon oxide, aluminum oxide, magnesium oxide, and calcium fluoride;

introducing the additive composition into a wellbore penetrating a subterranean formation;

producing a hydrocarbon fluid from the subterranean formation, thereby contacting the additive composition; and allowing the additive composition to inhibit the precipitation of at least one of asphaltenes, wax, and hydrates from the hydrocarbon fluid.

12. The method of claim 11, wherein at least one zone of the subterranean formation is about 15° C. or less.

13. The method of claim 11, wherein the produced hydrocarbon fluid contains the additive composition.

* * * * *